(12) United States Patent
Ogawa et al.

(10) Patent No.: US 8,603,691 B2
(45) Date of Patent: *Dec. 10, 2013

(54) FUEL CELL SYSTEM WITH ROTATION MECHANISM

(75) Inventors: Tetsuya Ogawa, Wako (JP); Jun Yamamoto, Wako (JP); Tomio Miyazaki, Wako (JP); Shuji Nagatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 12/532,616

(22) PCT Filed: Feb. 14, 2008

(86) PCT No.: PCT/JP2008/052906
§ 371 (c)(1),
(2), (4) Date: Sep. 22, 2009

(87) PCT Pub. No.: WO2008/114569
PCT Pub. Date: Sep. 25, 2008

(65) Prior Publication Data
US 2010/0112395 A1 May 6, 2010

(30) Foreign Application Priority Data

Mar. 22, 2007 (JP) .................................. 2007-075413
Mar. 22, 2007 (JP) .................................. 2007-075572

(51) Int. Cl.
*H01M 8/04* (2006.01)

(52) U.S. Cl.
USPC .......................... 429/433; 429/443; 429/444

(58) Field of Classification Search
None
See application file for complete search history.

(56) References Cited

U.S. PATENT DOCUMENTS

| 5,542,758 | A | * | 8/1996 | Brown ........................ 312/249.2 |
| 6,682,841 | B1 | * | 1/2004 | Armstrong et al. ............ 429/423 |
| 2002/0006535 | A1 | | 1/2002 | Woods et al. |
| 2003/0211374 | A1 | | 11/2003 | Dehne |
| 2004/0048120 | A1 | | 3/2004 | Haltiner et al. |
| 2006/0024552 | A1 | * | 2/2006 | Fujita et al. ..................... 429/34 |

FOREIGN PATENT DOCUMENTS

| EP | 0911895 A1 | 4/1999 |
| EP | 1329537 A2 | 7/2003 |
| EP | 1329537 A3 | 7/2003 |

(Continued)

OTHER PUBLICATIONS

International Search Report for Application No. PCT/JP2008/052906, dated Apr. 29, 2008.

(Continued)

*Primary Examiner* — Ula C Ruddock
*Assistant Examiner* — Tony Chuo
(74) *Attorney, Agent, or Firm* — Nelson Mullins Riley & Scarborough LLP (57) ABSTRACT

A casing of a fuel cell system is divided into a module area, a fluid supply area, and an electric parts area. The fluid supply area is provided on a first side surface of the module area, and an electric parts area is provided on a second side surface of the module area. A fuel cell module and a combustor are provided in the module area.

12 Claims, 12 Drawing Sheets

(56) References Cited

FOREIGN PATENT DOCUMENTS

| | | |
|---|---|---|
| JP | 7-86761 | 3/1995 |
| JP | 08-031436 | 2/1996 |
| JP | 2000-58102 | 2/2000 |
| JP | 2006-86017 | 3/2006 |
| JP | 2006-107941 | 4/2006 |
| JP | 2006-140164 | 6/2006 |
| JP | 2007-5180 | 1/2007 |

OTHER PUBLICATIONS

European Office Action for Application No. 08711695, dated Jan. 11, 2010.
European Office Action for Application No. 08711695.0, dated Jan. 22, 2010.
Japanese Office Action for Application No. 2007-075413, dated Feb. 7, 2012.

* cited by examiner

FUEL CELL SYSTEM WITH ROTATION MECHANISM

RELATED APPLICATIONS

This application is a 35 U.S.C. 371 national stage filing of International Application No. PCT/JP2008/052906, filed Feb. 14, 2008, which claims priority to Japanese Patent Application No. 2007-075413 and Japanese Patent Application No. 2007-075572, both filed on Mar. 22, 2007 in Japan. The contents of the aforementioned applications are hereby incorporated by reference.

TECHNICAL FIELD

The present invention relates to a fuel cell system including a casing containing a fuel cell module, a combustor, a fuel gas supply apparatus, an oxygen-containing gas supply apparatus, a water supply apparatus, a power conversion apparatus, and a control apparatus.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

As a fuel gas supplied to the fuel cell, normally, a hydrogen gas generated from a raw fuel of hydrocarbon by a reformer is used. In the reformer, in general, the raw fuel of hydrocarbon such as a fossil fuel, e.g., methane, LNG or the like is reformed to produce a reformed raw material gas. The reformed raw material gas undergoes steam reforming, partial oxidation reforming, autothermal reforming, or the like to produce a reformed gas (fuel gas).

In a known fuel cell system (fuel cell apparatus), a single unit case contains a fuel cell, a reformer, a power conversion apparatus for converting direct current power generated in the fuel cell into power in accordance with power supply output specification, a control apparatus, and auxiliary devices.

Figure 12:
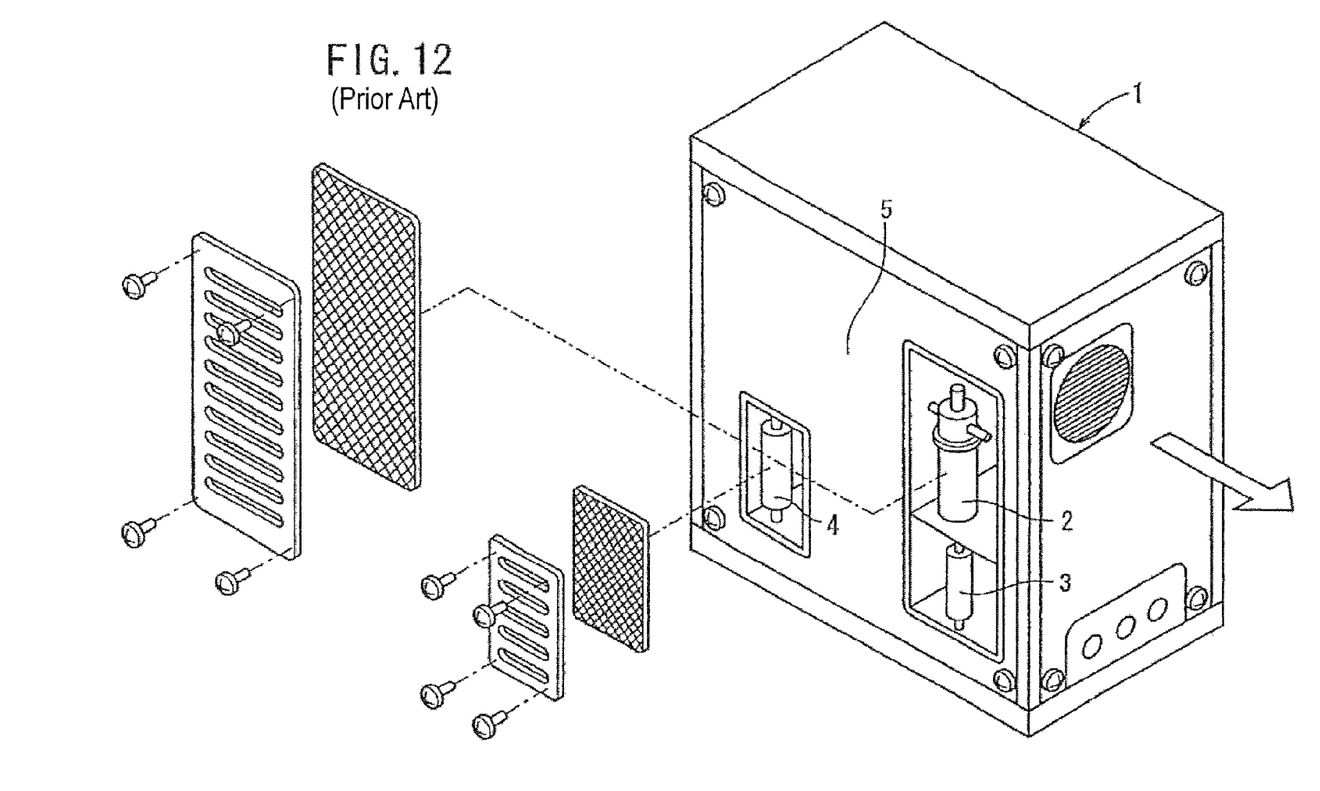
FIG. 12 is a perspective view schematically showing a conventional fuel cell apparatus.

For example, a fuel cell apparatus disclosed in Japanese Laid-Open Patent Publication No. 2006-140164 has a package 1 as shown in FIG. 12. A purification apparatus 2, an ion-exchanger apparatus 3, and a desulfurization apparatus 4 are provided on a front panel 5 as an outer panel of the package 1.

In the structure, the parts which require maintenance operation are not provided inside the package 1, but near the front panel 5 making up the outer panel of the fuel cell apparatus per se. According to the disclosure, it is possible to easily carry out maintenance operation for parts needed to be replaced or restored for continuing operation of the fuel cell apparatus.

However, in the conventional technique, operating temperatures and functions of the respective components or devices are not considered in the layout. Therefore, in particular, in the case where a high temperature fuel cell (solid oxide fuel cell, molten carbonate fuel cell or the like), or a medium temperature fuel cell (phosphoric acid fuel cell, hydrogen purification fuel cell or the like) is used, the components that should be operated at a low temperature tend to be affected by diffusion of heat or fluid from the fuel cell.

DISCLOSURE OF INVENTION

The present invention has been made to solve the problems of this type, and an object of the present invention is to provide a fuel cell system in which respective devices or components are provided separately depending on operating temperature ranges and functions to minimize diffusion of heat or fluid, it is possible to prevent thermal effects on the components operated at relatively low temperature.

The present invention relates to a fuel cell system including a fuel cell module for generating electricity by electrochemical reactions of a fuel gas and an oxygen-containing gas, a combustor for raising temperature of the fuel cell module, a fuel gas supply apparatus for supplying the fuel gas to the fuel cell module, an oxygen-containing gas supply apparatus for supplying the oxygen-containing gas to the fuel cell module, a water supply apparatus for supplying water to the fuel cell module, a power conversion apparatus for converting direct current power generated at the fuel cell module to power according to requirements specification, a control apparatus for controlling a power generation amount of the fuel cell module, and a casing containing the fuel cell module, the combustor, the fuel gas supply apparatus, the oxygen-containing gas supply apparatus, the water supply apparatus, the power conversion apparatus, and the control apparatus.

The casing is divided into a module area containing the fuel cell module and the combustor, a fluid supply area where the fuel gas supply apparatus, the oxygen-containing gas supply apparatus and the water supply apparatus are provided, and an electric parts area where the power conversion apparatus and the control apparatus are provided.

The module area has a polygonal shape in a plan view. The module area includes a first side surface and a second side surface intersecting at one corner. The fluid supply area is provided on the first side surface, the electric parts area is provided on the second side surface.

In the present invention, the space in the casing is divided into the module area where the fuel cell module and the combustor are provided, the fluid supply area where the fuel gas supply apparatus, the oxygen-containing gas supply apparatus and the water supply apparatus are provided, and the electric parts area where the electric power conversion apparatus and the control apparatus are provided. In the structure, since the space in the casing is divided according to the operating temperature and function, diffusion of heat or fluid is minimized, and in terms of functionality, the components are arranged optimally.

Further, the fluid supply area is provided on the first side surface of the module area. In the structure, since the fluid supply area forms the outer wall area of the casing, the fluid supply area is cooled efficiently, and the temperature of the fluid supply area does not increase significantly. Likewise, the electric parts area is provided on the second side surface of the module area. In the structure, since the electric parts area forms the outer wall area of the casing, the electric parts area is cooled efficiently, and the temperature of the electric parts area does not increase significantly. In the electric parts area, it is possible to prevent the thermal effects on the components used at relatively low temperature, e.g., the fluid supply area including pumps and the electric parts area including the control apparatus. Therefore, the components are reliably operated with suitable functionality.

BEST MODE FOR CARRYING OUT THE INVENTION

Figure 1:
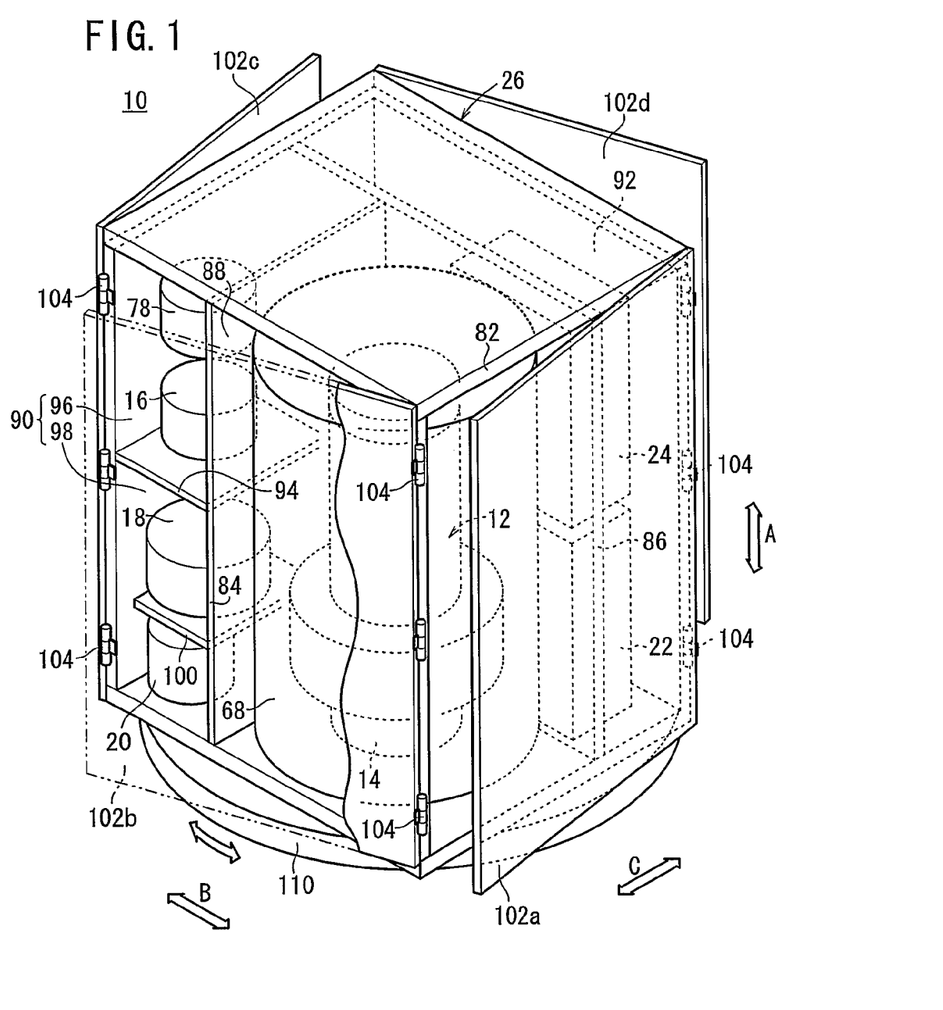
FIG. 1 is a perspective view schematically showing a fuel cell system according to a first embodiment of the present invention.
Figure 2:
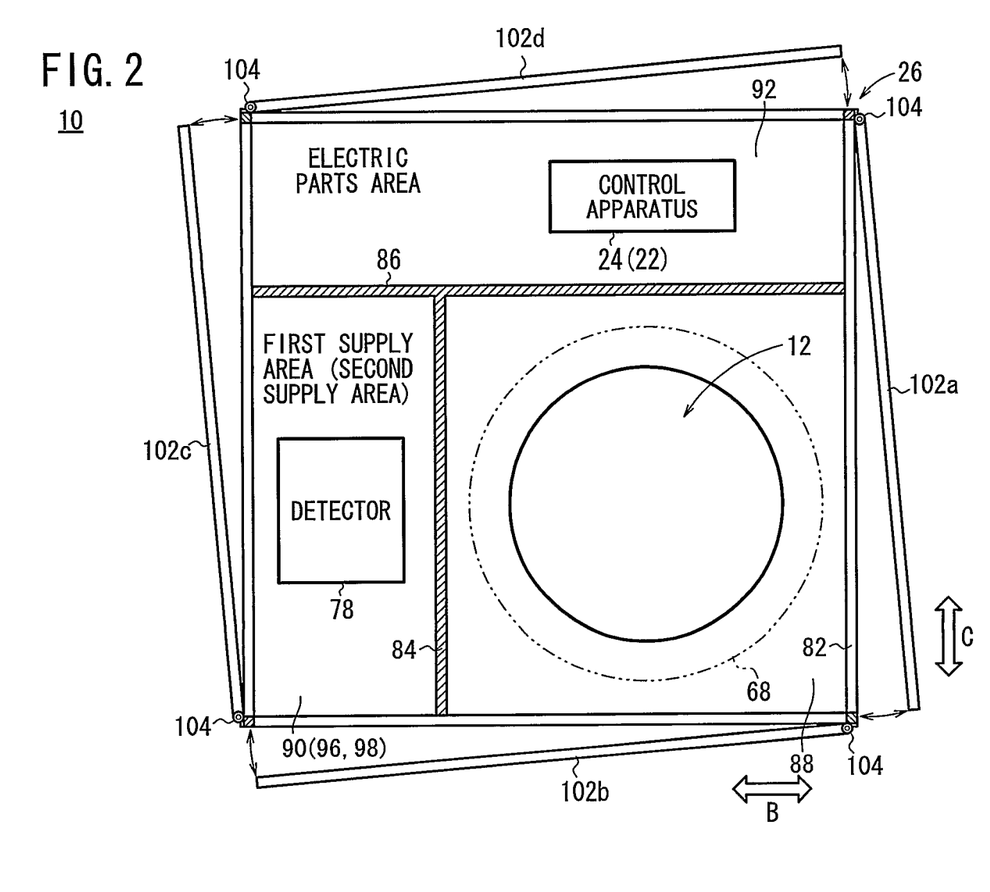
FIG. 2 is a plan view showing the fuel cell system.

FIG. 1 is a perspective view schematically showing a fuel cell system 10 according to a first embodiment of the present invention. FIG. 2 is a plan view showing the fuel cell system 10, FIG. 3 is a front view showing the fuel cell system 10, and FIG. 4 is a circuit diagram showing the fuel cell system 10.

The fuel cell system 10 is used in various applications, including stationary and mobile applications. For example, the fuel cell system 10 is mounted on a vehicle. The fuel cell system 10 includes a fuel cell module 12 for generating electricity by electrochemical reactions of a fuel gas (hydrogen gas) and an oxygen-containing gas (air), a combustor 14 for raising the temperature of the fuel cell module 12, a fuel gas supply apparatus (including a fuel gas pump) 16 for supplying the fuel gas to the fuel cell module 12, an oxygen-containing gas supply apparatus (including an air pump) 18 for supplying an oxygen-containing gas to the fuel cell module 12, a water supply apparatus (including a water pump) 20 for supplying water to the fuel cell module 12, and a power conversion apparatus 22 for converting the direct current power to the power according to the requirements specification, and a control apparatus 24 for controlling the power generation amount of the fuel cell module 12. The fuel cell module 12, the combustor 14, the fuel gas supply apparatus 16, the oxygen-containing gas supply apparatus 18, the water supply apparatus 20, the power conversion apparatus 22, and the control apparatus 24 are placed in a single casing 26.

Figure 5:
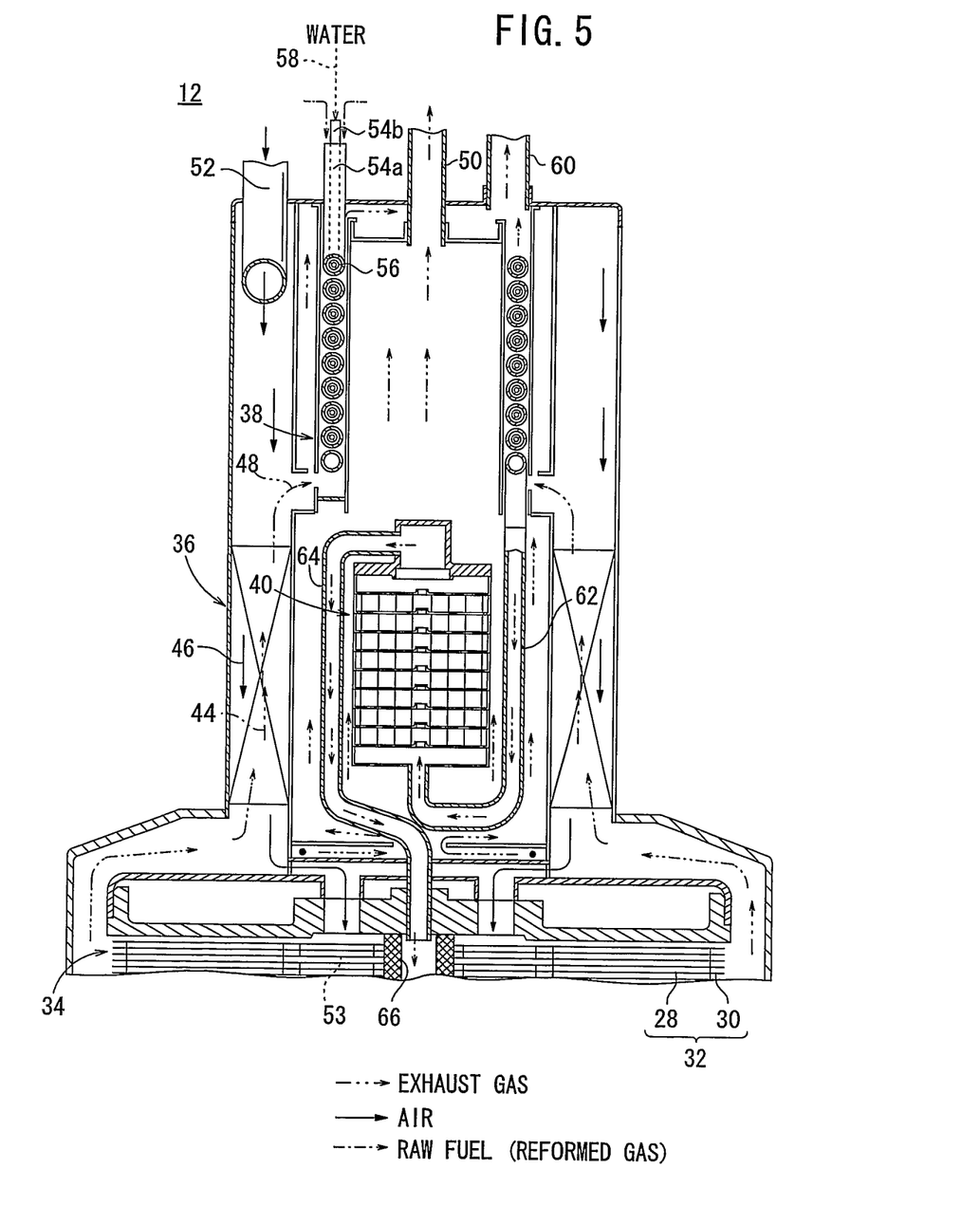
FIG. 5 is a cross sectional view showing main components of a fuel cell module of the fuel cell system.

The fuel cell module 12 includes a fuel cell stack 34 formed by stacking a plurality of solid oxide fuel cells 32 in a vertical direction (see FIG. 5). The fuel cells 32 are formed by stacking electrolyte electrode assemblies 28 and separators 30. Though not shown, each of the electrolyte electrode assemblies 28 includes an anode, a cathode, and an electrolyte (solid oxide) interposed between the anode and the cathode. For example, the electrolyte is made of ion-conductive solid oxide such as stabilized zirconia.

Figure 3:
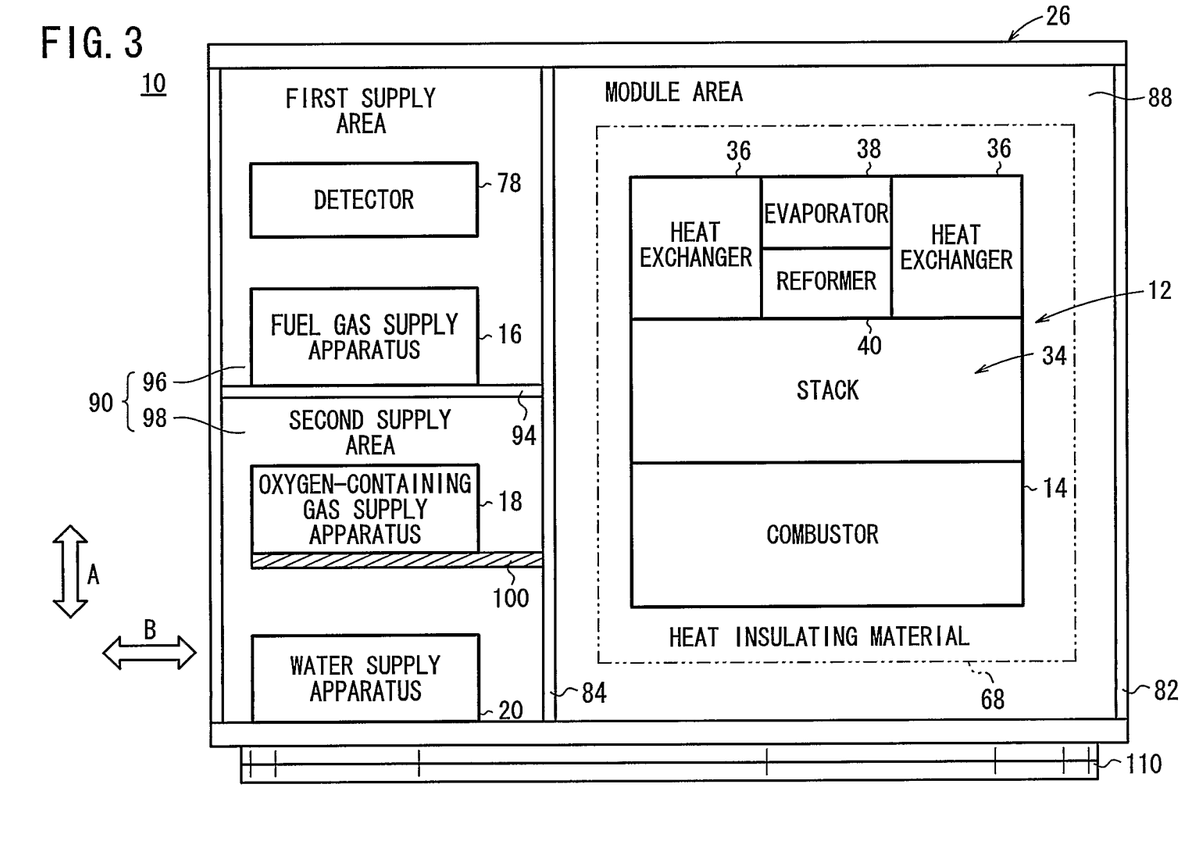
FIG. 3 is a front view showing the fuel cell system.
Figure 4:
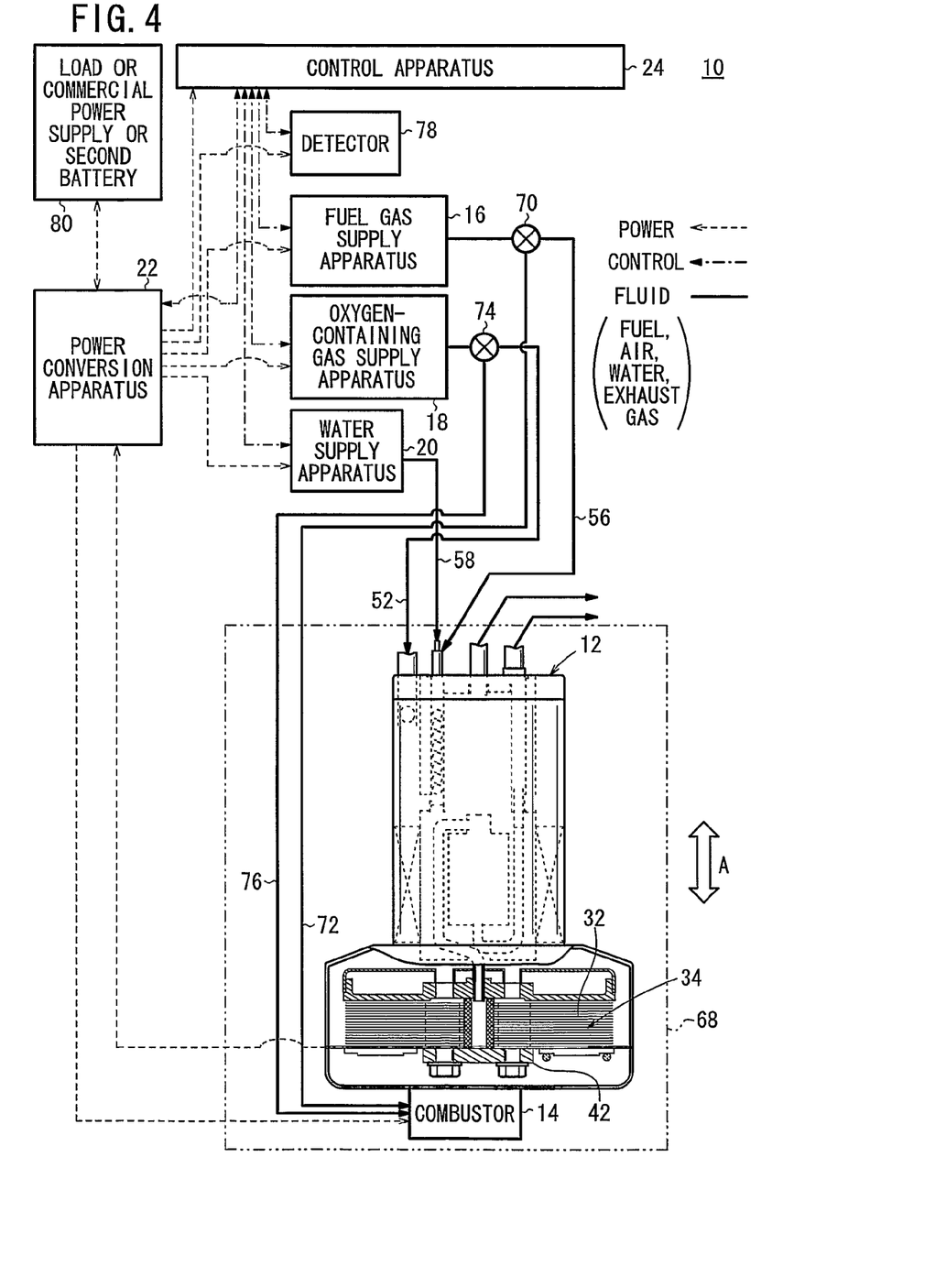
FIG. 4 is a circuit diagram showing the fuel cell system.

As shown in FIG. 3, at an upper end of the fuel cell stack 34 in a stacking direction, a heat exchanger 36, an evaporator 38, and a reformer 40 are provided. The heat exchanger 36 heats the oxygen-containing gas before it is supplied to the fuel cell stack 34. The evaporator 38 evaporates the water to produce a mixed fuel of a raw fuel (e.g., city gas) chiefly containing hydrocarbon and the water vapor. The reformer 40 reforms the mixed fuel to produce a reformed gas.

At a lower end of the fuel cell stack 34 in the stacking direction, a load applying mechanism 42 is provided (see FIG. 4). The load applying mechanism 42 applies a tightening load to the fuel cells 32 of the fuel cell stack 34 in the stacking direction indicated by the arrow A.

The reformer 40 is a preliminary reformer for reforming higher hydrocarbons ($C_{2+}$) such as ethane ($C_2H_6$), propane ($C_3H_8$), and butane ($C_4H_{10}$) in the city gas to produce the raw fuel gas chiefly containing methane ($CH_4$) by steam reforming, and the reformer 40 is operated at an operating temperature of several hundred degrees C.

The operating temperature of the fuel cell 32 is high, at the temperature of several hundred degrees C. In the electrolyte electrode assembly 28, methane in the fuel gas is reformed to produce hydrogen, and the hydrogen is supplied to the anode.

As shown in FIG. 5, the heat exchanger 36 has a first exhaust gas passage 44 for allowing consumed reactant gas (hereinafter referred to as the exhaust gas or combustion exhaust gas) to flow through the first exhaust gas passage 44 and an air passage 46 for allowing the air as heated fluid to flow through the air passage 46 in a direction opposite to the exhaust gas in a counterflow manner. The first exhaust gas passage 44 is connected to a second exhaust gas passage 48 for supplying the exhaust gas to the evaporator 38, as a heat source for evaporating the water. The second exhaust gas passage 48 is connected to an exhaust pipe 50. The upstream side of the air passage 46 is connected to an air supply pipe 52, and the downstream side of the air passage 46 is connected to an oxygen-containing gas supply passage 53 of the fuel cell stack 34.

The evaporator 38 adopts dual pipe structure including an outer pipe member 54a and an inner pipe member 54b that are coaxially disposed. The dual pipe structure is provided inside the second exhaust gas passage 48. A raw fuel passage 56 is formed between the outer pipe member 54a and the inner pipe member 54b. A water passage 58 is formed inside the inner pipe member 54b. The second exhaust gas passage 48 of the evaporator 38 is connected to a main exhaust pipe 60.

A mixed fuel supply pipe 62 is connected to the outer pipe member 54a, and connected to an inlet of the reformer 40. The outlet of the reformer 40 is connected to one end of a reformed gas supply passage 64, and the other end of the reformed gas supply passage 64 is connected to the fuel gas supply passage 66 of the fuel cell stack 34. The fuel cell module 12 and the combustor 14 are surrounded by the heat insulating material 68 (see FIG. 3).

As shown in FIG. 4, the fuel gas supply apparatus 16 is connected to the raw fuel passage 56, and a raw fuel branch passage 72 is connected to a switching valve 70 in the middle of the raw fuel passage 56. Further, the raw fuel branch passage 72 is connected to the combustor 14.

The oxygen-containing gas supply apparatus 18 is connected to an air supply pipe 52, and an air branch passage 76 is connected to a switching valve 74 in a middle of the air supply pipe 52. Further, the air branch passage 76 is connected to the combustor 14. For example, the combustor 14 has a burner, and as described above, the raw fuel and the air are supplied to the combustor 14. Instead of the burner, it is possible to use other means such as an electric heater. In this case, the supply of the raw fuel, the air, and electricity is carried out selectively as necessary.

The water supply apparatus 20 is connected to the water passage 58. The fuel gas supply apparatus 16, the oxygen-containing gas supply apparatus 18, and the water supply apparatus 20 are controlled by the control apparatus 24. The control apparatus 24 is electrically connected to a detector 78 for detecting the fuel gas. For example, a commercial power supply 80 (or, e.g., a load, or a secondary battery) is connected to the power conversion apparatus 22.

As shown in FIGS. 1 to 3, the casing 26 has an outer frame 82 having a rectangular shape as a whole. In the outer frame 82, a first vertical partition plate 84 for dividing the space in the casing 26 in a horizontal direction indicated by an arrow B, and a second vertical partition plate 86 for dividing the space in the casing 26 in a horizontal direction indicated by an arrow C (direction perpendicular to the direction indicated by the arrow B) are provided.

As shown in FIGS. 1 and 2, a module area 88 has a rectangular shape (polygonal shape) in a plan view. The module area 88 includes the first vertical partition plate 84 and the second vertical partition plate 86. The first vertical partition plate 84 is a first side surface, and the second vertical partition plate 86 is a second side surface intersecting at one corner of the module area 88. A fluid supply area 90 is provided on the first vertical partition plate 84, and an electric parts area 92 is provided on the second vertical partition plate 86. The fluid supply area 90 and the electric parts area 92 form an outer wall area of the casing 26.

As shown in FIGS. 1 and 3, the fuel cell module 12 and the combustor 14 are disposed in the module area 88. The fuel cell module 12 is provided above the combustor 14. The fuel cell module 12 and the combustor 14 are provided inside the heat insulating material 68. The power conversion apparatus 22 and the control apparatus 24 are provided in the electric parts area 92.

The fluid supply area 90 is vertically divided into a first supply area 96 and a second supply area 98 by the lateral partition plate 94. The fuel gas supply apparatus 16 and the detector 78 that is disposed above the fuel gas supply apparatus 16 are provided in the first supply area 96. The oxygen-containing gas supply apparatus 18 and the water supply apparatus 20 that is disposed at the lowermost part of the fluid supply area 90 are provided in the second supply area 98. The oxygen-containing gas supply apparatus 18 is held by a table 100 in the second supply area 98.

As shown in FIGS. 1 and 2, the casing 26 has a rectangular shape in a plan view. The casing 26 has a first door 102a, a second door 102b, a third door 102c, and a fourth door 102d as side surfaces. Each of the first to fourth doors 102a to 102d is supported at one end, by the outer frame 82 of the casing 26 using a hinge 104 with the other end openable and closable.

The first door 102a partially opens, and closes the module area 88 and the electric parts area 92 all together. The second door 102b partially opens and closes the module area 88 and the fluid supply area 90 together. The third door 102c partially opens and closes the fluid supply area 90 and the electric parts area 92 together. The fourth door 102d opens and closes the electric parts area 92.

As shown in FIGS. 1 and 3, the casing 26 is rotatable about its vertical axis through a rotation mechanism 110. For example, the rotation mechanism 110 has known structure such as a turntable.

Operation of the fuel cell system 10 will be described below.

As shown in FIG. 4, under operation of fuel gas supply apparatus 16, a raw fuel such as the city gas ($CH_4$, $C_2H_6$, $C_3H_8$, $C_4H_{10}$) is supplied to the raw fuel passage 56. Under operation of the water supply apparatus 20, water is supplied to the water passage 58. Further, an oxygen-containing gas such as the air is supplied to the air supply pipe 52 by the oxygen-containing gas supply apparatus 18.

As shown in FIG. 5, in the evaporator 38, the water vapor is mixed with the raw fuel flowing through the raw fuel passage 56. The mixed fuel is supplied to the inlet of the reformer 40 through the mixed fuel supply pipe 62. The mixed fuel is reformed by steam reforming in the reformer 40. The hydrocarbon of $C_{2+}$ is removed (reformed) to produce a reformed gas (fuel gas) chiefly containing methane. The reformed gas flows through the reformed gas supply passage 64 connected to the outlet of the reformer 40, and the reformed gas is supplied to the fuel gas supply passage 66 of the fuel cell stack 34. Thus, methane in the reformed gas is reformed to produce a hydrogen gas, and the fuel gas chiefly containing the hydrogen gas is supplied to the anode (not shown).

When the air supplied from the air supply pipe 52 to the heat exchanger 36 flows along the air passage 46 of the heat exchanger 36, heat exchange is carried out between the air and the exhaust gas flowing along the first exhaust gas passage 44 as described later, and the air is heated to the desired temperature. The air heated by the heat exchanger 36 is supplied to the oxygen-containing gas supply passage 53 of the fuel cell stack 34, and then, supplied to the cathode (not shown).

Thus, in the electrolyte electrode assembly 28, electricity is generated by electrochemical reactions of the fuel gas and the air. The exhaust gas discharged from the outer circumferential portion of each electrolyte electrode assembly 28 has a high temperature (several hundreds degrees C.). When the exhaust gas flows through the first exhaust gas passage 44, heat exchange between the exhaust gas and the air is performed for heating the air to the desired temperature and for cooling the exhaust gas.

Then, the exhaust gas flows along the second exhaust gas passage 48 to evaporate the water passing through the water passage 58. After the exhaust gas passes through the evaporator 38, the exhaust gas is discharged to the outside through the main exhaust pipe 60.

In the first embodiment, as shown in FIGS. 1 and 3, the module area 88 is formed by dividing the space in the casing 26 in the horizontal directions. The fuel cell module 12 and the combustor 14 are provided in the module area 88, and the fuel cell module 12 is provided above the combustor 14. In the structure, the heat (several hundreds degrees C.) generated by operation of the combustor 14 is transmitted upwardly, and reliably supplied to the area around the fuel cell module 12 provided above the combustor 14. Therefore, the temperature of the fuel cell module 12 increases in a short period of time by the heat transmitted upwardly from the combustor 14. Accordingly, improvement in the performance of warming up, and starting operation of the fuel cell system 10 is achieved.

Further, the space in the casing 26 is divided into the module area 88, the fluid supply area 90 and the electric parts area 92. The fuel cell module 12 and the combustor 14 are provided in the module area 88. The fuel gas supply apparatus 16, the oxygen-containing gas supply apparatus 18 and the water supply apparatus 20 are provided in the fluid supply area 90. The power conversion apparatus 22 and the control apparatus 24 are provided in the electric parts area 92. That is, the space in the casing 26 is divided for each of different temperatures and functions to minimize diffusion of heat and fluid. In terms of functionality, the components in the casing 26 are arranged optimally.

Further, in the first embodiment, the fluid supply area 90 is provided on the first side surface (first vertical partition plate 84) of the module area 88. In the structure, in effect, the fluid supply area 90 forms an outer wall area of the casing 26. The fluid supply area 90 is cooled efficiently, and the temperature of the fluid supply area 90 does not increase significantly. Likewise, the electric parts area 92 is provided on the second side surface (second vertical partition plate 86) of the module area 88. In the structure, in effect, the electric parts area 92 forms an outer wall area of the casing 26. The electric parts area 92 is cooled efficiently, and the temperature of the electric parts area 92 does not increase significantly.

Thus, the electric parts area 92 including the control apparatus 24 which needs to be maintained at a low temperature (about 40° C.), and the fluid supply area 90 including pumps are operated to have reliable and suitable functionality.

Further, in the first embodiment, as shown in FIGS. 1 and 2, the first door 102*a*, the second door 102*b*, the third door 102*c*, and the fourth door 102*d* are provided corresponding to the respective side surfaces of the casing 26. Therefore, for example, at the time of carrying out maintenance operation in the module area 88, it is sufficient to open the first door 102*a* and/or the second door 102*b*, and the maintenance operation in the module area 88 is carried out easily.

At the time of carrying out safety checking operation or the like for the control apparatus 24 in the electric parts area 92, it is sufficient to only open the fourth door 102*d*, and the safety checking operation for the control apparatus 24 is carried out swiftly and easily.

At the time of carrying out safety checking operation for the pumps of the like in the fluid supply area 90, it is sufficient to open the third door 102*c* only, and the safety checking operation for the pumps is carried out swiftly and easily. Accordingly, the maintenance operation and safety checking operation are carried out efficiently in each of the module area 88, the fluid supply area 90, and the electric parts area 92.

The casing 26 is rotatable around the vertical axis through the rotation mechanism 110. Therefore, by rotating the casing 26, any one of the first door 102*a*, the second door 102*b*, the third door 102*c*, and the fourth door 102*d* can be positioned such that the operator can open, or close the door. Therefore, further improvement in the performance of carrying out the safety checking operation or the maintenance operation is achieved.

The space in the casing 26 is divided into the module area 88, the fluid supply area 90, and the electric parts area 92 by the first vertical partition plate 84 and the second vertical partition plate 86. The fuel cell module 12 and the combustor 14 are provided in the module area 88. The detector 78, the fuel gas supply apparatus 16, the oxygen-containing gas supply apparatus 18, and the water supply apparatus 20 are provided in the fluid supply area 90. The power conversion apparatus 22 and the control apparatus 24 are provided in the electric parts area 92.

Thus, the space in the casing 26 is divided into the module area 88, the fluid supply area 90, and the electric parts area 92 for respective operating temperatures and functions. In the structure, diffusion of heat and fluid is minimized, and components in the casing 26 are arranged optimally in terms of functionality. Further, in the module area 88 having a high temperature, for example, the heat insulating material 68 around the fuel cell module 12 and the combustor 14 for heat insulation may be configured to have a substantial thickness to reduce thermal affects to the outside.

Further, in the first embodiment, the water supply apparatus 20 is provided at the bottom of the fluid supply area 90. Therefore, even if water leaks from the water supply apparatus 20, it is possible to prevent the fuel gas supply apparatus 16 and the oxygen-containing gas supply apparatus 18 from getting wet.

Further, in the fluid supply area 90, the detector 78 is provided at the top of the fluid supply area 90. Thus, even if leakage of the fuel gas from the fuel gas supply apparatus 16 occurs, it is possible to rapidly and reliably detect the gas leakage by the detector 78.

In the fluid supply area 90, the fuel gas supply apparatus 16 is provided above the oxygen-containing gas supply apparatus 18. The oxygen-containing gas supply apparatus 18 has the air pump, and the fuel gas supply apparatus 16 has the fuel gas pump. In particular, in the fuel cell system 10 having a large A/F value, the volume and weight of the air pump is greater than the volume and weight of the fuel gas pump.

Thus, the oxygen-containing gas supply apparatus 18 is provided below the fuel gas supply apparatus 16 for installation stability. Further, even if leakage of the fuel gas from the fuel gas supply apparatus 16 occurs, the fuel gas is not sucked into the oxygen-containing gas supply apparatus 18.

The space in the fluid supply area 90 is divided by the lateral partition plate 94 into the first supply area 96 where the detector 78 and the fuel gas supply apparatus 16 are provided, and the second supply area 98 where the oxygen-containing gas supply apparatus 18 and the water supply apparatus 20 are provided. In the structure, in particular, even if leakage of the fuel gas from the fuel gas supply apparatus 16 occurs, it is possible to reliably prevent the fuel gas from being sucked into the oxygen-containing gas supply apparatus 18.

The fuel cell module 12 is a high temperature fuel cell system, e.g., comprising a solid oxide fuel cell (SOFC) module to achieve the desired advantages. Instead of the solid oxide fuel cell module, other high temperature type fuel cell modules or medium temperature type fuel cell modules may be adopted suitably. For example, molten carbonate fuel cells (MCFC), phosphoric acid fuel cells (PAFC), hydrogen membrane fuel cells (HMFC) or the like may be adopted suitably.

Further, in the first embodiment, the heat exchanger 36, the evaporator 38, and the reformer 40 are provided above the fuel cell stack 34, and the combustor 14 is provided under the fuel cell stack 34. In the structure, the heat from the combustor 14 tends to be concentrated at the fuel cell stack 34. Reduction in the time of raising the temperature of the fuel cell stack 34 is effectively achieved, and improvement in the performance of warming up and starting operation of the fuel cell stack 34 is achieved.

Figure 6:
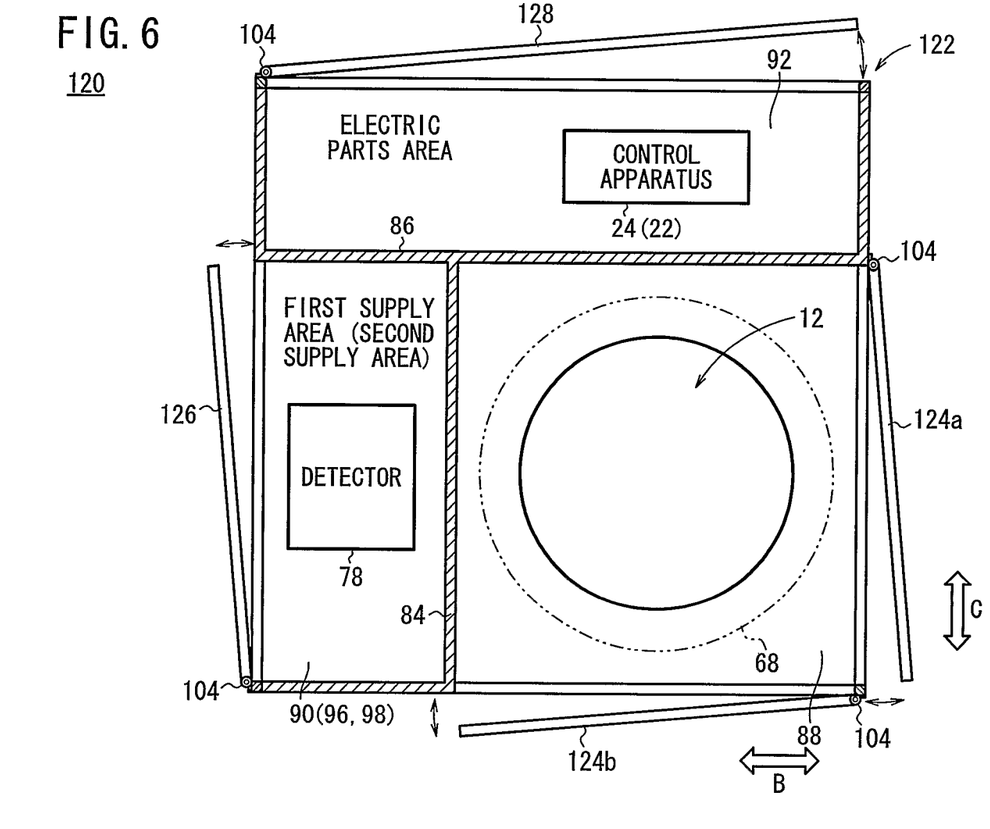
FIG. 6 is a plan view schematically showing a fuel cell system according to a second embodiment of the present invention.

FIG. 6 is a plan view showing a fuel cell system 120 according to a second embodiment of the present invention. The constituent elements that are identical to those of the fuel cell system 10 according to the first embodiment are labeled with the same reference numeral, and description thereof will be omitted. Also in third to fifth embodiments as described later, the constituent elements that are identical to those of the fuel cell system 10 according to the first embodiment are labeled with the same reference numeral, and description thereof will be omitted.

The fuel cell system 120 includes a casing 122 having a rectangular shape in a plan view. The casing 122 has a first module area door 124*a*, a second module area door 124*b*, a fluid supply area door 126 and an electric parts area door 128. The first module area door 124*a* and the second module area door 124*b* are doors for different side surfaces of only the module area 88. The fluid supply area door 126 is a door for only the fluid supply area 90. The electrical parts area door 128 is a door only for the electric parts area 92. In the structure of the second embodiment, the same advantages as in the case of the first embodiment can be obtained.

Further, in the second embodiment, for example, at the time of carrying out the safety checking operation in the module area 88, by opening the first module area door 124*a* and/or the second module area door 124*b*, only the module area 88 is opened to the outside. In particular, when the safety checking operation is carried out immediately after operation of the fuel cell system 120 is stopped, the hot fluid in the module area 88 is not diffused to the electric parts area 92, the fluid supply area 90 or the like.

Further, at the time of carrying out the maintenance operation for the fluid supply area 90 by opening the fluid supply area door 126, only the fluid supply area 90 is opened to the outside. In the structure, heat transfer or fluid diffusion does not occur between the fluid supply area 90 and the electric parts area 92. Thus, it is possible to carry out the safety checking operation and the maintenance operation separately for each of the module area 88, the fluid supply area 90, and the electric parts area 92, and it is possible to prevent heat transfer and fluid diffusion as much as possible.

Figure 7:
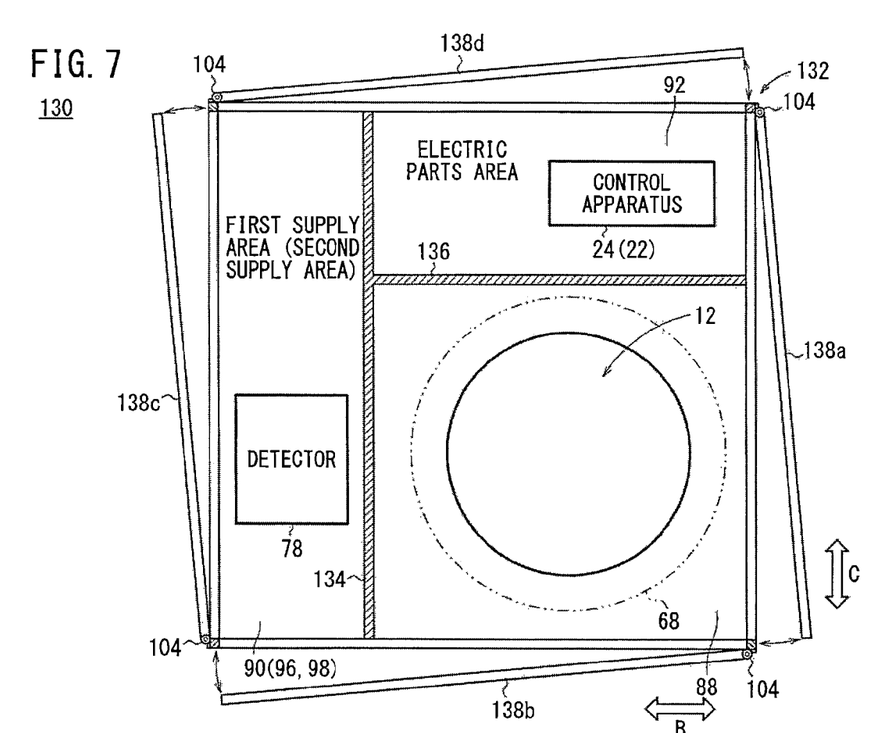
FIG. 7 is a plan view showing a fuel cell system according to a third embodiment of the present invention.

FIG. 7 is a plan view showing a fuel cell system 130 according to a third embodiment of the present invention.

The fuel cell system 130 includes a casing 132 having a rectangular shape in a plan view. The space in the casing 132 is divided into the module area 88, the fluid supply area 90, and the electric parts area 92 by a first vertical partition plate 134 and a second vertical partition plate 136. The first vertical partition plate 134 is longer than the second vertical partition plate 136. In the structure, the volume of the fluid supply area 90 is larger than the volume of the electric parts area 92.

A first door 138*a*, a second door 138*b*, a third door 138*c*, and a fourth door 138*d* are provided corresponding to respective side surfaces of the casing 132. The first door 138*a* partially opens and closes the module area 88 and the electric parts area 92 together. The second door 138*b* partially opens and closes the module area 88 and the fluid supply area 90 together. The third door 138*c* opens and closes the fluid supply area 90. The fourth door 138*d* partially opens and closes the electric parts area 92 and the fluid supply area 90 together. In the third embodiment, the same advantages as in the case of the first embodiment can be obtained.

Figure 8:
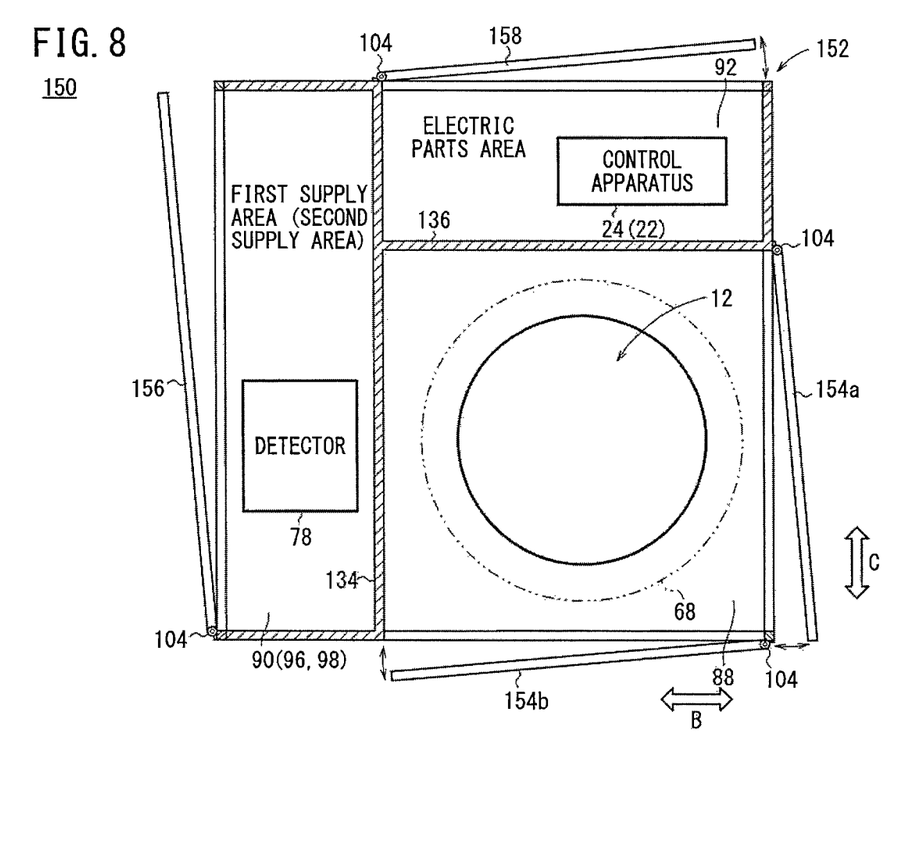
FIG. 8 is a plan view showing a fuel cell system according to a fourth embodiment of the present invention.

FIG. 8 is a plan view showing a fuel cell system 150 according to a fourth embodiment of the present invention. The constituent elements that are identical to those of the fuel cell system 130 according to the third embodiment are labeled with the same reference numeral, and description thereof will be omitted.

The fuel cell system 150 includes a casing 152, and the casing 152 has a first module area door 154*a* and a second module area door 154*b* only for the module area 88, a fluid supply area door 156 only for the fluid supply area 90, and an electrical parts area door 158 only for the electric parts area 92. Thus, in the fourth embodiment, the same advantages as in the case of the second embodiment can be obtained.

Figure 9:
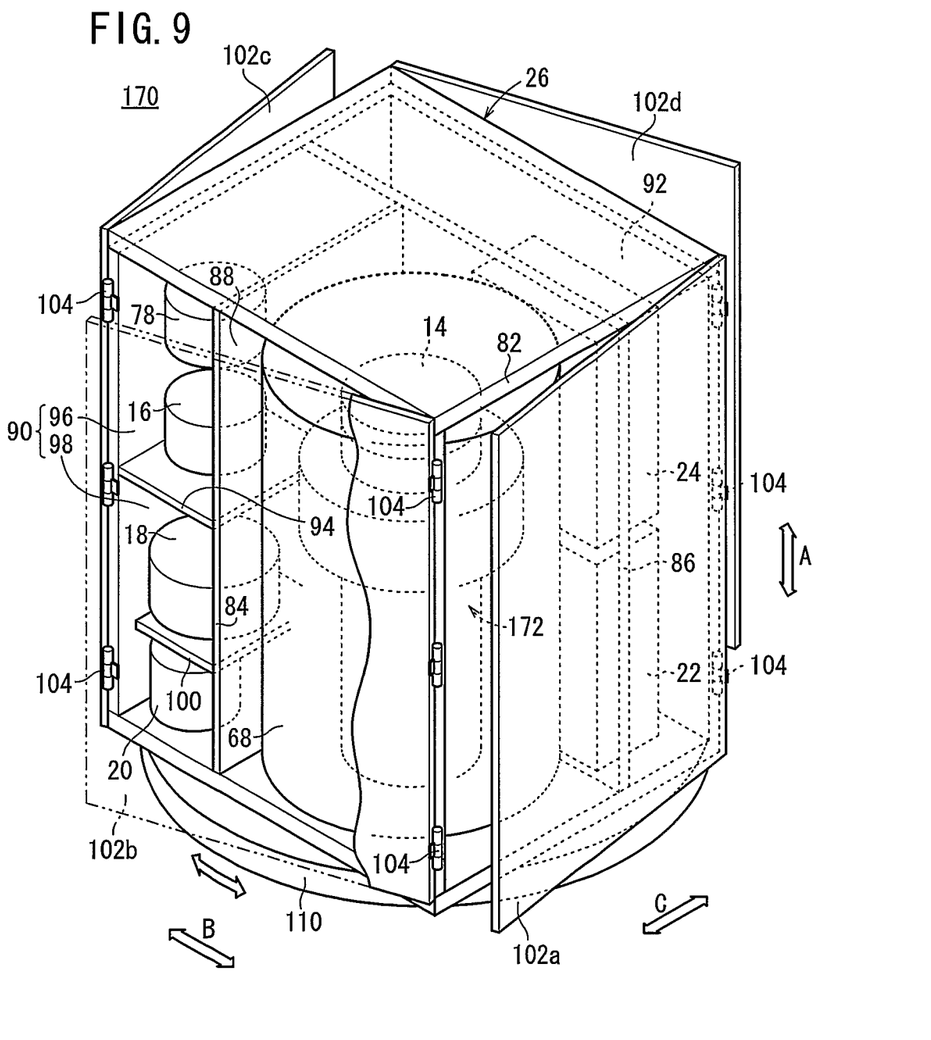
FIG. 9 is a perspective view schematically showing a fuel cell system according to a fifth embodiment of the present invention.
Figure 10:
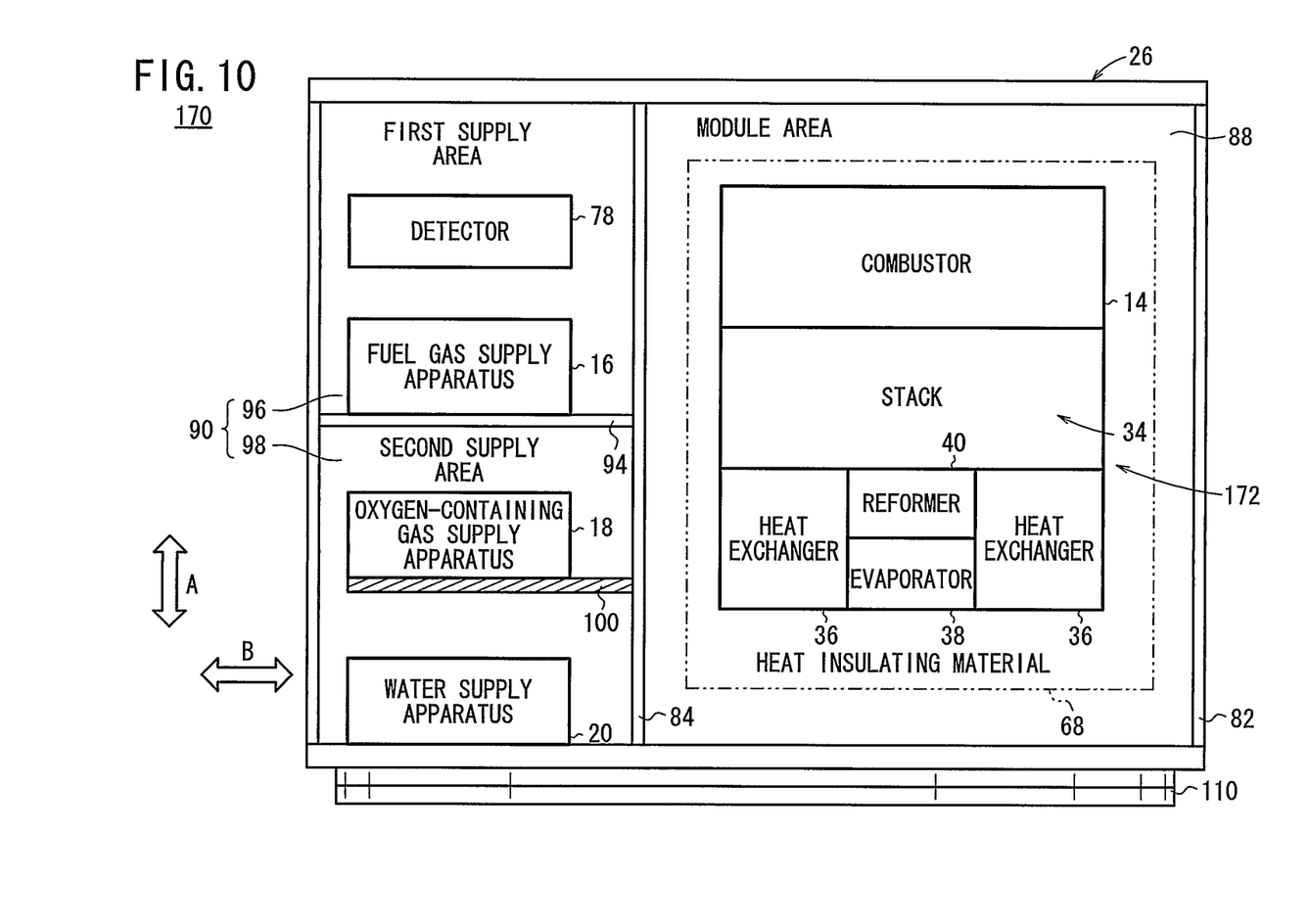
FIG. 10 is a front view showing the fuel cell system.

FIG. 9 is a perspective view schematically showing a fuel cell system 170 according to a fifth embodiment of the present invention. FIG. 10 is a front view showing the fuel cell system 170, and FIG. 11 is a circuit diagram showing the fuel cell system 170.

The fuel cell system 170 includes a fuel cell module 172. As shown in FIG. 10, in the fuel cell module 172, a heat exchanger 36, an evaporator 38, and a reformer 40 are provided at the bottom of the fuel cell stack 34 in the stacking direction.

Figure 11:
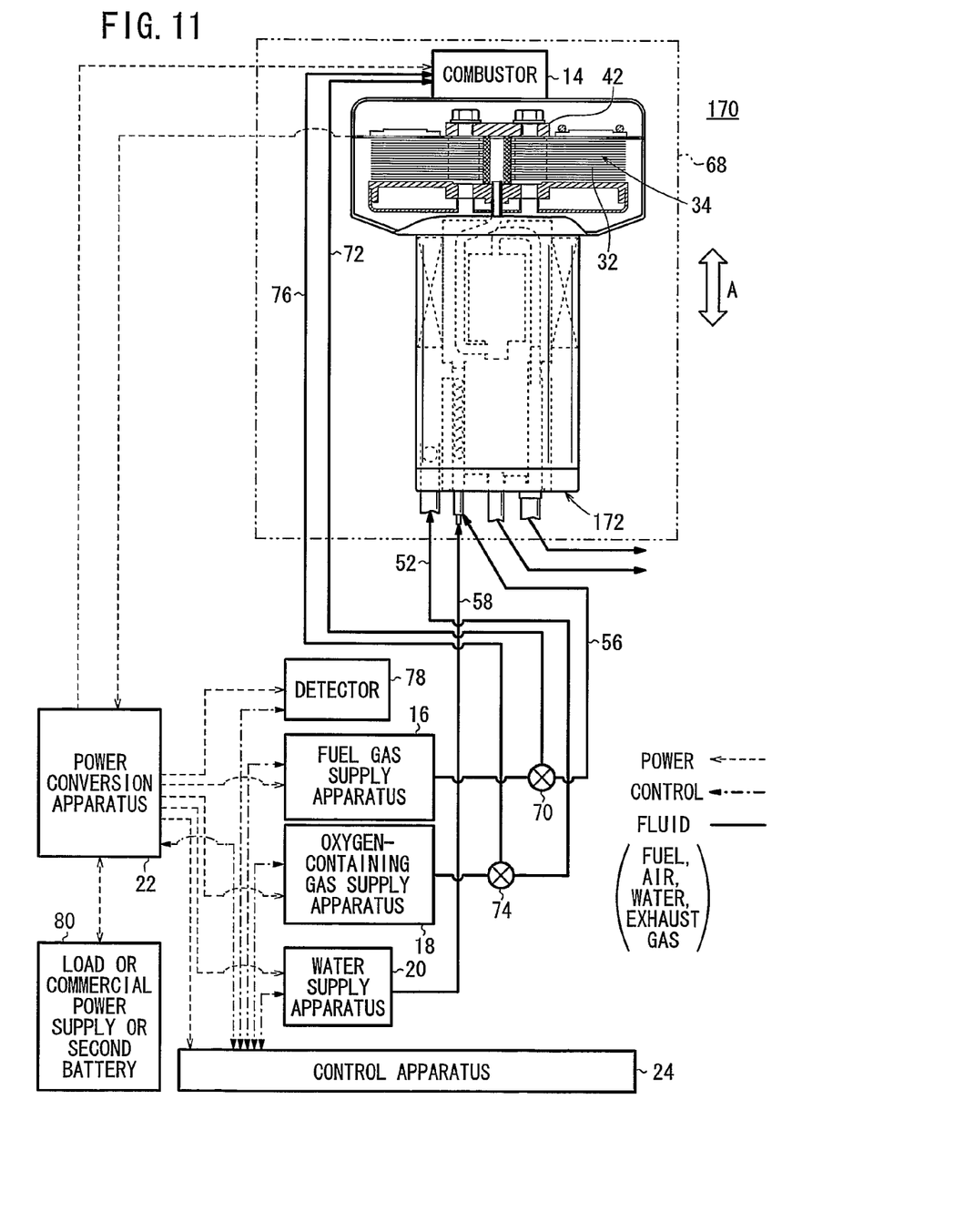
FIG. 11 is a circuit diagram showing the fuel cell system.

At an upper end of the fuel cell stack 34 in the stacking direction, a load applying mechanism 42 is provided for applying a tightening load in the stacking direction of the fuel cells 32 indicted by the arrow A (see FIG. 11).

As shown in FIGS. 9 and 10, the fuel cell module 172 and the combustor 14 are provided in the module area 88, and the fuel cell module 172 is provided under the combustor 14. The fuel cell module 172 and the combustor 14 are provided inside the heat insulating material 68.

In the fifth embodiment, as shown in FIGS. 9 and 10, the module area 88 is formed by dividing the space in the casing 26 horizontally. The fuel cell module 172 and the combustor 14 are provided in the module area 88. The combustor 14 is provided above the fuel cell module 172.

Thus, the heat (several hundreds degrees C.) generated by operation of the combustor 14 is supplied to the desired position of the fuel cell module 172, i.e., the fuel cell stack 34 for raising the temperature of the fuel cell stack 34.

Further, the other positions (components) of the fuel cell module 172 operated at relatively low temperature, i.e., the heat exchanger 36, the evaporator 38, and the reformer 40 are not exposed to the heat excessively. The heat exchanger 36, the evaporator 38, and the reformer 40, are provided under the fuel cell stack 34. Thus, it is possible to improve the durability and product life of, in particular, the heat exchanger 36, the evaporator 38, the reformer 40, and pipes.

In the fifth embodiment, the heat exchanger 36, the evaporator 38, and the reformer 40 are provided under the fuel cell stack 34, and the combustor 14 is provided above the fuel cell stack 34. In the structure, the heat from the combustor 14 is supplied to the fuel cell stack 34 for raising the temperature of the fuel cells stack 34. Further, since the heat exchanger 36, the evaporator 38, and the reformer 40 are not exposed to the heat from the combustor 14 excessively, improvement in the durability and product life of these components are achieved.

In the fifth embodiment, the casing 26 is provided as in the case of the first embodiment. The present invention is not limited in this respect. The casing 122, 132, or 152 may be provided in the same manner as in the cases of the second to fourth embodiments.

Although certain preferred embodiments of the present invention have been shown and described in detail, it should be understood that various changes and modifications may be made therein without departing from the scope of the appended claims.

The invention claimed is:

1. A fuel cell system comprising:
a fuel cell module for generating electricity by electrochemical reactions of a fuel gas and an oxygen-containing gas;
a combustor for raising temperature of said fuel cell module;
a fuel gas supply apparatus for supplying the fuel gas to said fuel cell module;
an oxygen-containing gas supply apparatus for supplying the oxygen-containing gas to said fuel cell module;
a water supply apparatus for supplying water to said fuel cell module;
a power conversion apparatus for converting direct current power generated at said fuel cell module to power according to requirements specification;
a control apparatus for controlling a power generation amount of said fuel cell module; and
a casing containing said fuel cell module, said combustor, said fuel gas supply apparatus, said oxygen-containing gas supply apparatus, said water supply apparatus, said power conversion apparatus, and said control apparatus,
said casing being divided into three spaces in a plan view by vertical partition plates extending in a vertical direction, the three spaces being mutually separated and forming:
a module area containing said fuel cell module and said combustor;
a fluid supply area where said fuel gas supply apparatus, said oxygen-containing gas supply apparatus, and said water supply apparatus are provided; and
an electric parts area where said power conversion apparatus and said control apparatus are provided, wherein said module area has a polygonal shape in a plan view, including a first side surface and a second side surface intersecting at one corner, said fluid supply area is provided on one of the vertical partition plates having the first side surface of the module area, and said electric parts area is provided on another of the vertical partition plates having the second side surface, wherein said casing includes doors for opening and closing said module area, said fluid supply area, and said electric parts area, and wherein said casing has a rotation mechanism rotatable about a vertical axis of said rotation mechanism, wherein said rotation mechanism is a turntable.

2. A fuel cell system according to claim 1, wherein said fuel cell module is provided above said combustor.

3. A fuel cell system according to claim 1, wherein said combustor is provided above said fuel cell module.

4. A fuel cell system according to claim 1, wherein said water supply apparatus is provided at a bottom of said fluid supply area.

5. A fuel cell system according to claim 1, wherein said fluid supply area includes a detector for detecting the fuel gas, and said detector is provided at a top of said fluid supply area.

6. A fuel cell system according to claim 1, wherein said fuel gas supply apparatus is provided above said oxygen-containing gas supply apparatus in said fluid supply area.

7. A fuel cell system according to claim 5, wherein said fluid supply area is divided into: a first supply area containing said detector and said fuel gas supply apparatus; and a second supply area containing said oxygen-containing gas supply apparatus and said water supply apparatus.

8. A fuel cell system according to claim 1, wherein said casing is divided horizontally into said module area, said fluid supply area, and said electric parts area by at least one vertical partition plate.

9. A fuel cell system according to claim 1, wherein said fuel cell module is a solid oxide fuel cell module.

10. A fuel cell system according to claim 9, said solid oxide fuel cell module comprising:

a solid oxide fuel cell stack formed by stacking a plurality of solid oxide fuel cells, said solid oxide fuel cells each formed by stacking an electrolyte electrode assembly and a separator, said electrolyte electrode assembly at least including an anode, a cathode, and a solid electrolyte interposed between said anode and said cathode;

a heat exchanger for heating an oxygen-containing gas before the oxygen-containing gas is supplied to said solid oxide fuel cell stack;

an evaporator for evaporating water to produce a mixed fuel of a raw fuel chiefly containing hydrocarbon and water vapor; and a reformer for reforming the mixed fuel to produce a reformed gas.

11. A fuel cell system according to claim 10, wherein said heat exchanger, said evaporator, and said reformer are provided above said fuel cell stack.

12. A fuel cell system according to claim 10, wherein said heat exchanger, said evaporator, and said reformer are provided under said fuel cell stack.

* * * * *